July 14, 1959 — J. J. BLACK ET AL — 2,894,650
CARGO AND FREIGHT TRANSPORTING SYSTEMS
Filed Dec. 21, 1956 — 6 Sheets-Sheet 1
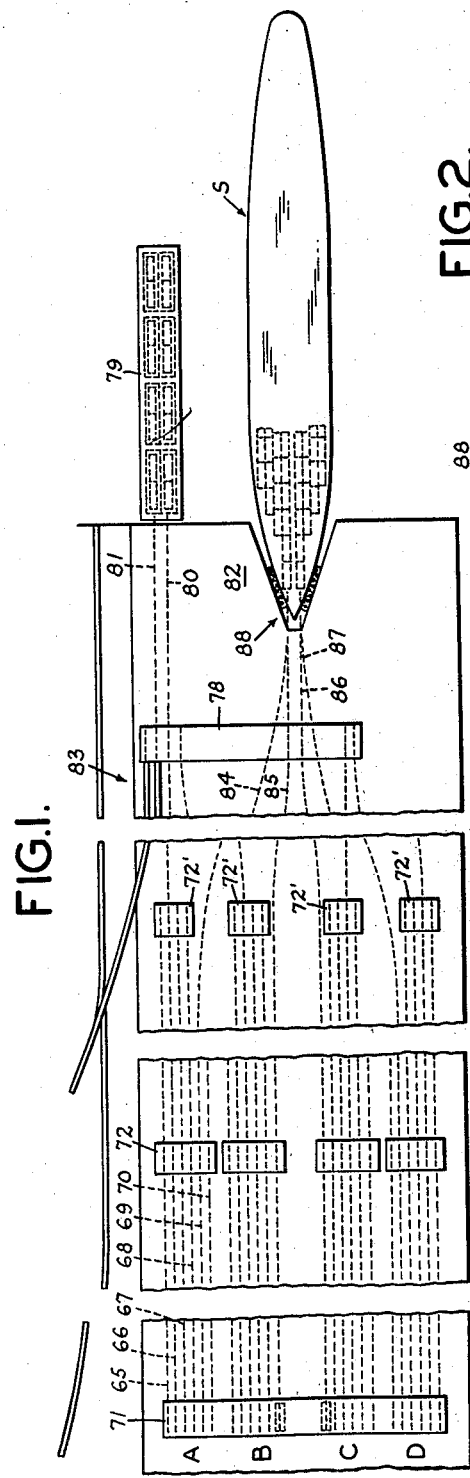
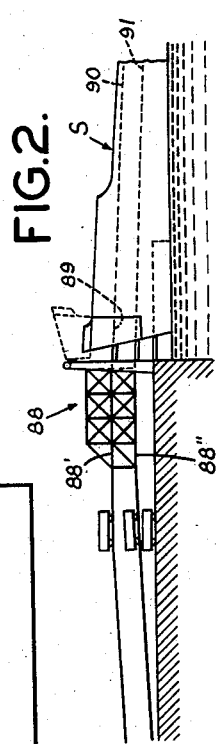
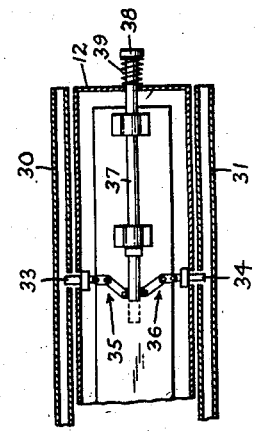
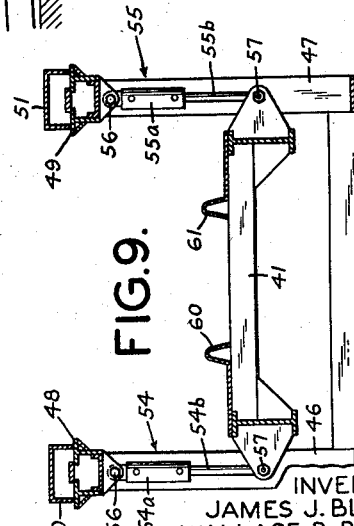
INVENTORS
JAMES J. BLACK
WALLACE B. BRIAN
MEYER J. FRECHIE
WILLIAM R. HUMMEL
ALAN McILHENNY
FRED H. RAHE
ROBERT W. SUMAN
BY
Campbell, Brumbaugh, Free & Graves
THEIR ATTORNEYS

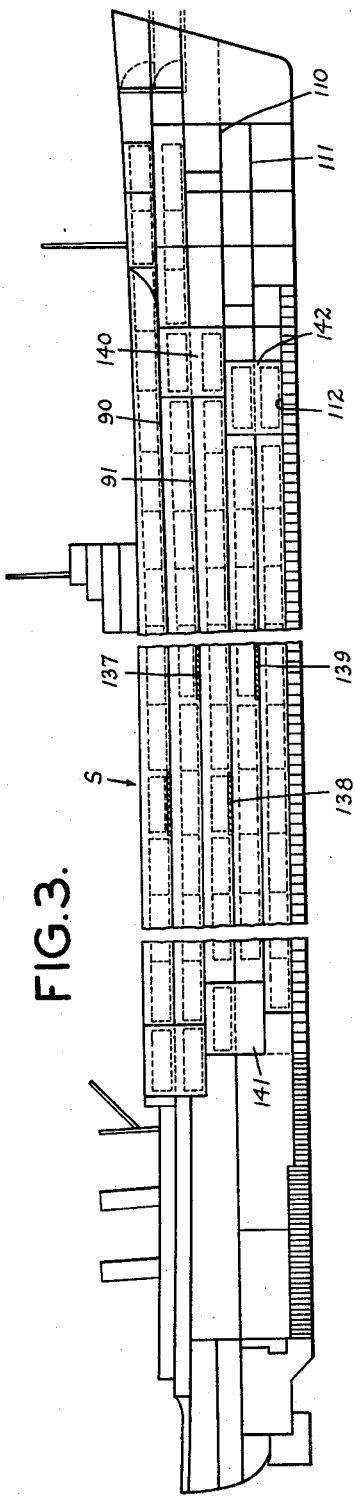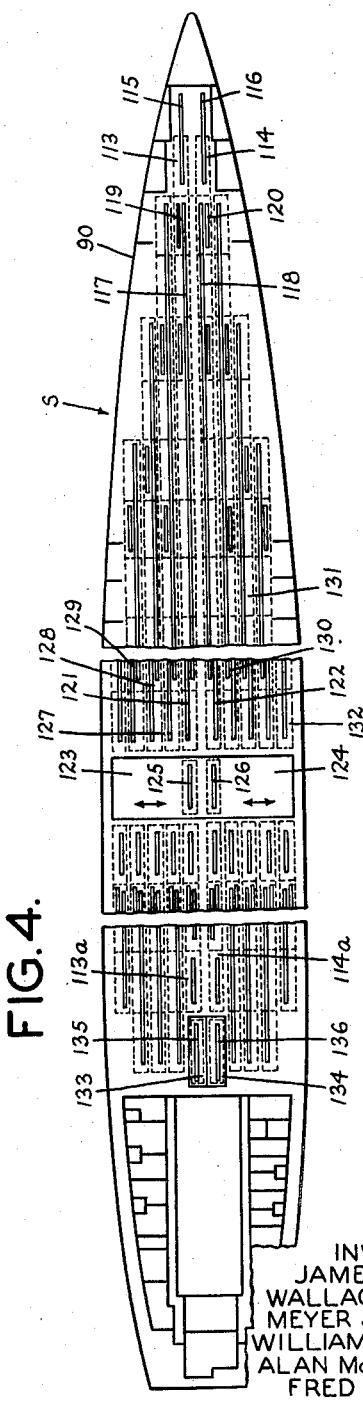

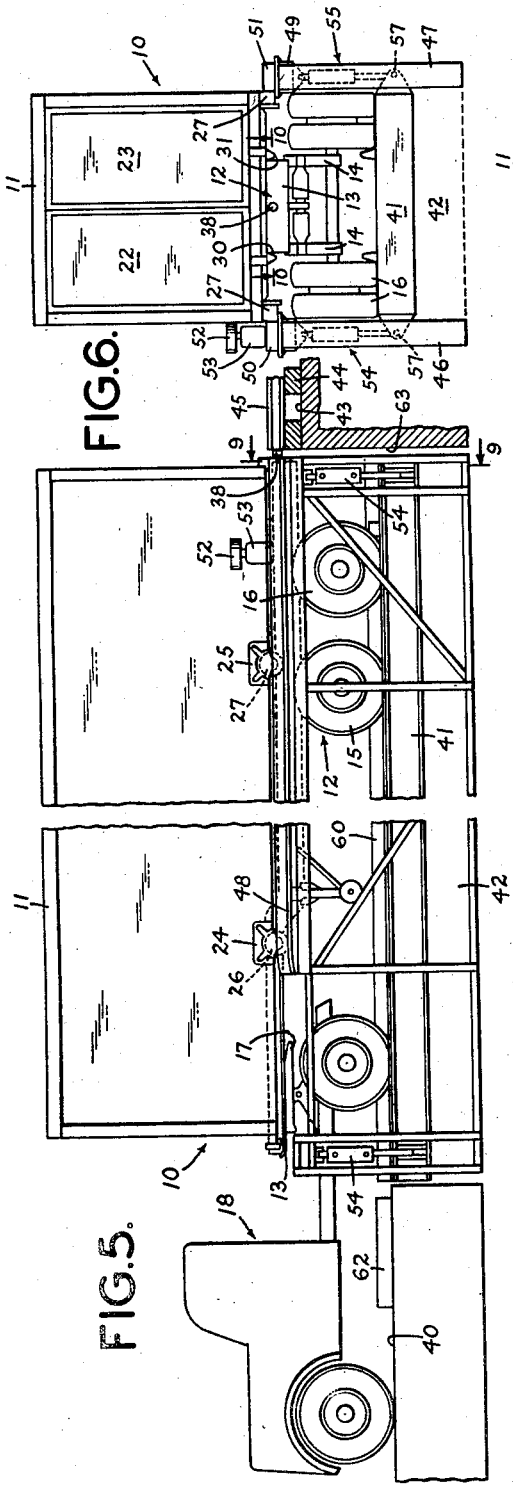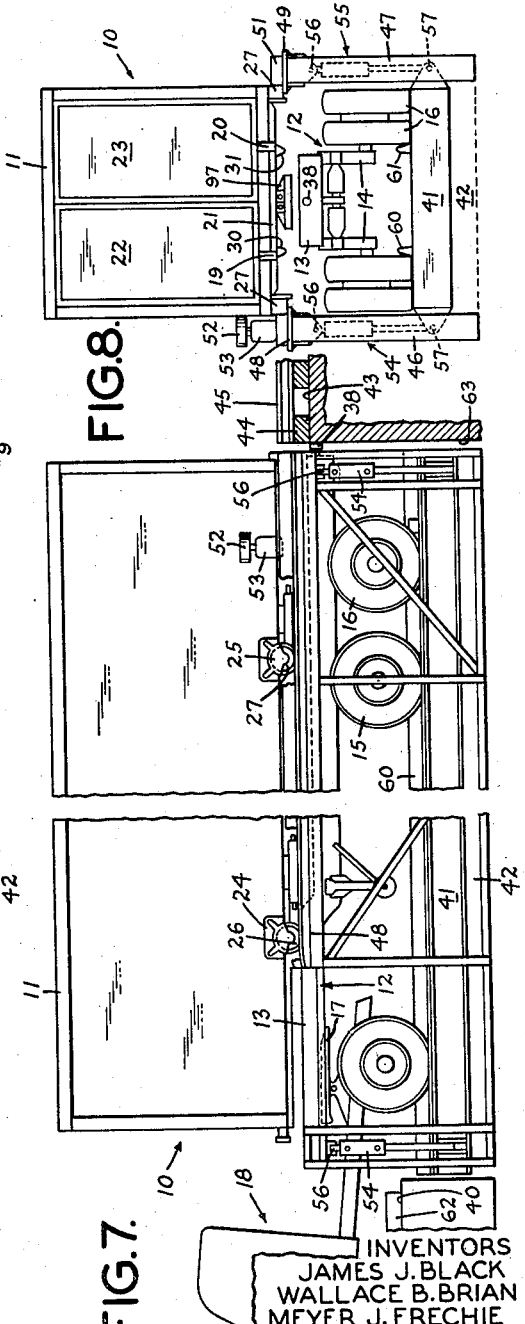

July 14, 1959    J. J. BLACK ET AL    2,894,650
CARGO AND FREIGHT TRANSPORTING SYSTEMS
Filed Dec. 21, 1956    6 Sheets-Sheet 4

INVENTORS
JAMES J. BLACK
WALLACE B. BRIAN
MEYER J. FRECHIE
WILLIAM R. HUMMEL
ALAN McILHENNY
FRED H. RAHE
ROBERT W. SUMAN
BY
THEIR ATTORNEYS

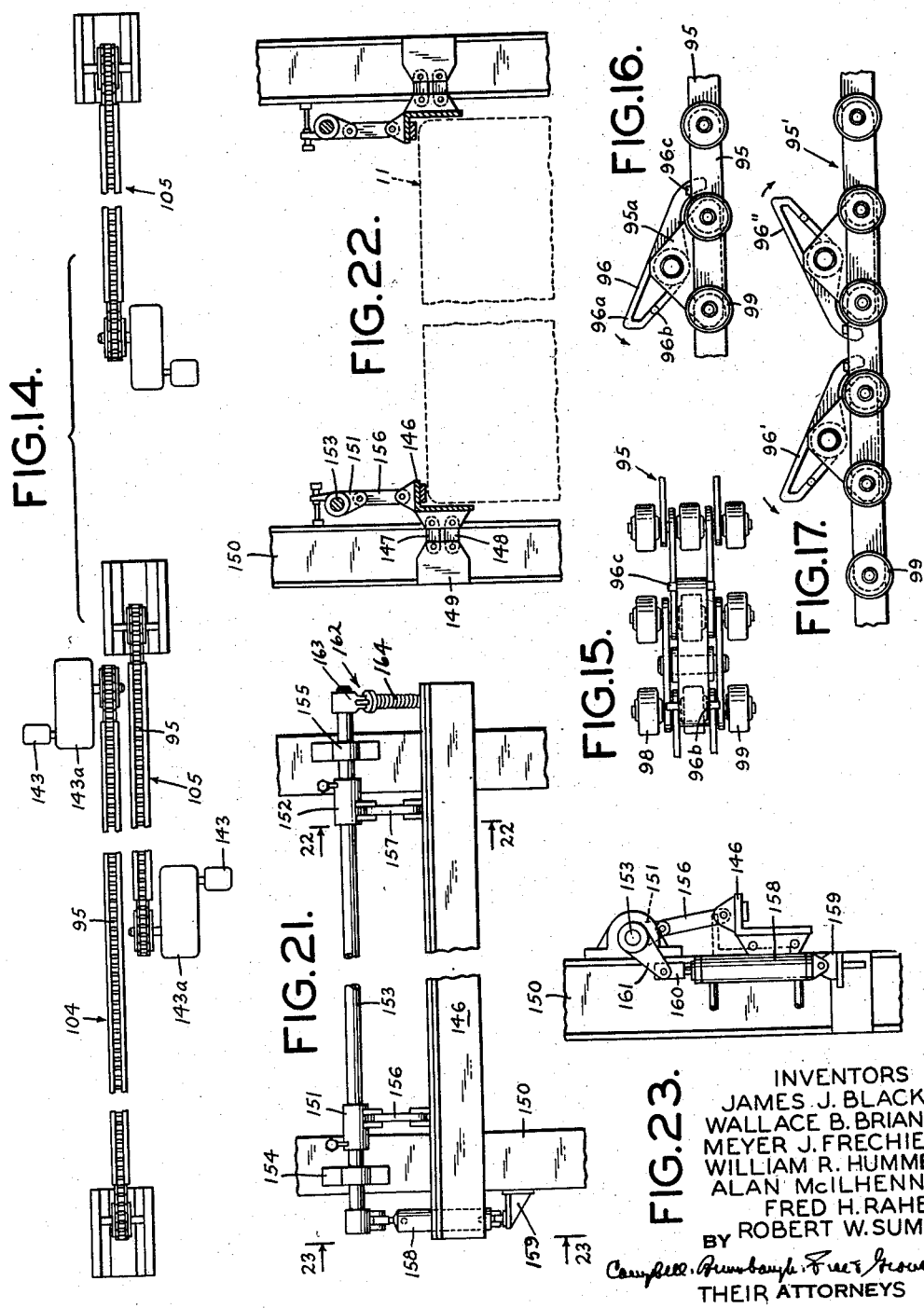

July 14, 1959   J. J. BLACK ET AL   2,894,650
CARGO AND FREIGHT TRANSPORTING SYSTEMS
Filed Dec. 21, 1956   6 Sheets-Sheet 6
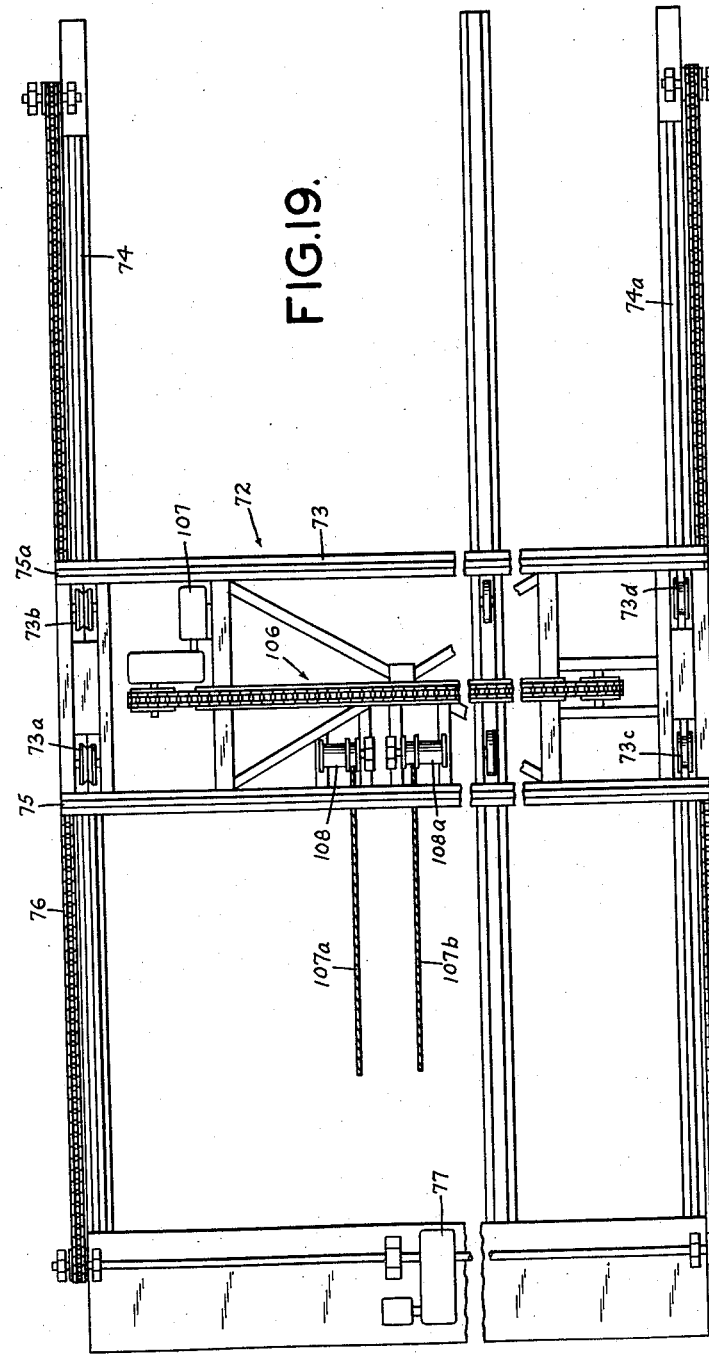
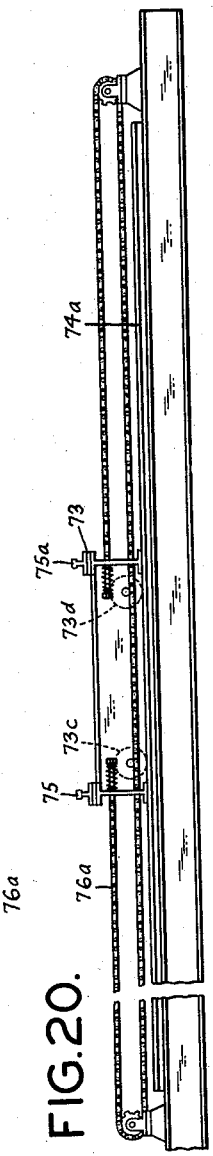
INVENTORS
JAMES J. BLACK
WALLACE B. BRIAN
MEYER J. FRECHIE
WILLIAM R. HUMMEL
ALAN McILHENNY
FRED H. RAHE
BY ROBERT W. SUMAN
THEIR ATTORNEYS

2,894,650

CARGO AND FREIGHT TRANSPORTING SYSTEMS

James J. Black, Cincinnati, Ohio, Wallace B. Brian, Virginia Beach, Va., Meyer J. Frechie, Philadelphia, Pa., William R. Hummel, Cincinnati, Ohio, Alan McIlhenny, Newtown Square, Pa., Fred H. Rahe, Little Neck, N.Y., and Robert W. Suman, Hatboro, Pa., assignors to American-Hawaiian Steamship Company, New York, N.Y., a corporation of Delaware Application December 21, 1956, Serial No. 629,810

5 Claims. (Cl. 214—38)

This invention relates to transportation systems and particularly to a system by means of which freight can be transported by land and sea and transferred between land vehicles and ships and other water craft with a minimum of handling.

The cargoes transported by ships are usually loaded and unloaded by stevedores and due to the use of relatively crude and inefficient equipment, days are required to unload the cargo of a ship and reload the ship.

It has been proposed heretofore to handle cargo in large containers, such as, for example, in the form of loaded freight cars or the trailers of motor vehicles and thereby reduce the difficulty and time required for loading and unloading. While the handling of freight cars and trailers has a number of advantages, many disadvantages also are present. Freight cars are heavy and are so large that they must be handled by switch engines or winches and, of course, are useful only for freight that is shipped by rail. Moreover, the size of the cars is such that several shipments to different destinations frequently are present in a single car. In order to load and unload such part-car shipments, manual labor is required at the different loading points and destinations, thereby offsetting to a large degree the hoped-for advantages of large container handling. Moreover, freight cars occupy space all out of proportion to their carrying capacity on shipboard and require excessive spacing between decks to receive them.

Inasmuch as a great deal of freight is shipped by tractor-drawn trailer, it has been proposed that such trailers could be carried "piggy-back" on flat cars when long distances are to be traversed and that the complete trailer can be transported together with many other such trailers on cargo vessels. The shipment of trailers has about the same advantages as the shipment of freight cars and the same and other disadvantages. A trailer body is supported on pneumatic tires and springs at one end and for that reason the trailer bounces in transport. Moreover, a tire can deflate on a trailer with the result that the trailer body may lean and interfere with other trailers or freight on adjacent railway tracks or in the hull of a ship. To overcome these effects, it is necessary to provide a complicated system for lashing the trailers to the flat car or to the deck of the ship. The attachment of the lashing and the release thereof must be done manually and is expensive and time-consuming and not altogether fool-proof. In addition, the combined height of a trailer and a flat car for transporting it "piggy-back" is too great to allow the car to pass through many railroad tunnels.

An even more serious disadvantage of the trailer type transport used heretofore is that the costs of operation are greatly increased by the use of the complete trailers because the body and chassis, including the wheels and springs, must be transported. The chassis contributes nothing to the carrying capacity of the trailer when it is used merely as a container. On the other hand, it increases the over-all weight of the cargo and also removes from operation a complete trailer so that for long periods of time, the chassis of the trailer is of no use and is, in fact, detrimental.

In addition to the other disadvantages of trailer operations, there is the problem of storing large numbers of trailers and of marshalling them in appropriate parking areas or terminals so that they can be conveniently loaded on the ships or unloaded therefrom and picked up by the tractors. No practical way has been devised to overcome the traffic jams in such a parking area occurring because of the need for a tractor to move each trailer.

In accordance with the present invention, we have provided an all weather transportation system by means of which the disadvantages pointed out above are completely overcome and a great many advantages are obtained, particularly with respect to ease of handling of freight and reduction of turn-around time during the loading and unloading of ships. Moreover, the new system greatly reduces manual handling of and damage to freight, pilferage, and the like, which has greatly harmed the shipping industry in the past.

More particularly, in accordance with the present invention, we have provided a system which makes use of vehicles for the transportation of freight, the vehicles having detachable cargo or freight-carrying bodies provided with wheels so that they may in turn serve as wheeled containers that may be readily handled in appropriately equipped terminals or marshalling yards and may be loaded on and unloaded from ships, other water craft, flat cars, aircraft and the like with a minimum of manual handling. The system also includes a mechanism by means of which the bodies of the vehicles may be readily unloaded from or reloaded onto a vehicle chassis. In a preferred form of the invention the vehicle is a tractor drawn trailer in which the trailer body is provided with wheels and is detachable from the chassis of the trailer. The use of trailers with detachable bodies has many advantages. For example, one or more trailers may be moved to a manuafcturer's freight-loading department where they may be filled and the doors sealed and the destination indicated on them. Different trailer bodies may be loaded for different destinations and they may be then transported to a marshalling yard where the bodies are detached and moved about the yard to bring them into the proper association with other trailer loads of freight from other manufacturers which are going to the same destinations. The trailer bodies then may be loaded onto a cargo vessel in such order that discharge of the various trailer bodies at their point of destination may be accomplished without disturbing other freight or trailer bodies which go to other destinations. In order to facilitate this movement, conveying means is used to move the detached bodies along individually or in groups and to sort and classify the bodies as to destination so as to facilitate loading on ships, flat cars or the like.

By providing trailers with detachable trailer bodies, each chassis can be kept in service to transport other trailer bodies in a given area. In this way, a relatively small number of trailer chasses can handle efficiently many times that number of trailer bodies, thereby greatly reducing the investment required for the production of the trailer chassis and their bodies. Moreover, inasmuch as the detached bodies have considerably less height than the combined body and chassis, problems relating to the "piggy-back" handling of the chassis on railway flat cars are reduced to a minimum. It is unnecessary to have complicated fastening elements because there are no spring suspensions for the trailer bodies and no tires thereon to become flat and possibly cause tilting of the trailer body relative to the flat car. Moreover, the over-all height of such trailer body and flat car is comparable to that of conventional freight cars so that such "piggy-back" assemblies can pass through almost any tunnel capable of handling an ordinary freight car. In the same way, less spacing is required between the decks of a vessel equipped to handle such detached trailer bodies and thereby a greater carrying capacity is obtained in a hull of a predetermined size.

For a better understanding of the present invention, reference may be had to the accompanying drawings in which:

Figure 1 is a schematic illustration of a typical marshalling yard or terminal for practicing the present invention;

Figure 2 is a view in side elevation of a portion of a yard showing the arrangement of ramps for loading a ship;

Figure 3 is a sectional view of a typical ship for transporting cargo in accordance with the present invention;

Figure 4 is a horizontal sectional view of the ship illustrating the arrangement of a cargo-carrying deck;

Figure 5 is a side elevational view of a typical trailer and tractor embodying the present invention and an unloading or transfer device for detaching the body of the trailer from its chassis;

Figure 6 is an end elevational view of the trailer and the unloading device;

Figure 7 is a side elevational view of the unloading device illustrating the manner in which the trailer body is detached from the trailer chassis;

Figure 8 is an end elevational view with the trailer chassis and trailer body in the position shown in Figure 7;

Figure 9 is a view in section taken on line 9—9 of Figure 5;

Figure 10 is a plan view of a locking mechanism for locking the trailer body to the trailer chassis;

Figure 14 is a plan view of a conveyor system shown partially broken away including a plurality of conveyors for advancing the cargo-carrying bodies along tracks;

Figure 15 is a plan view of a portion of a conveyor chain;

Figure 16 is a view in side elevation of a portion of the conveyor chain showing a single pusher dog thereon;

Figure 17 is a side elevational view of a conveyor chain having pusher dogs thereon for pushing cargo-carrying bodies in opposite directions along the tracks;

Figure 19 is a plan view of a transfer device for shifting trailer bodies from one track to another;

Figure 20 is a side elevational view of the transfer device;

Figure 21 is a front elevational view of a clamping mechanism used on the vessel for retaining the cargo-carrying bodies against movement in the vessel;

Figure 22 is a view in section taken on line 22—22 of Figure 21; and

Figure 23 is an end elevational view of the clamping device.

Figure 12:
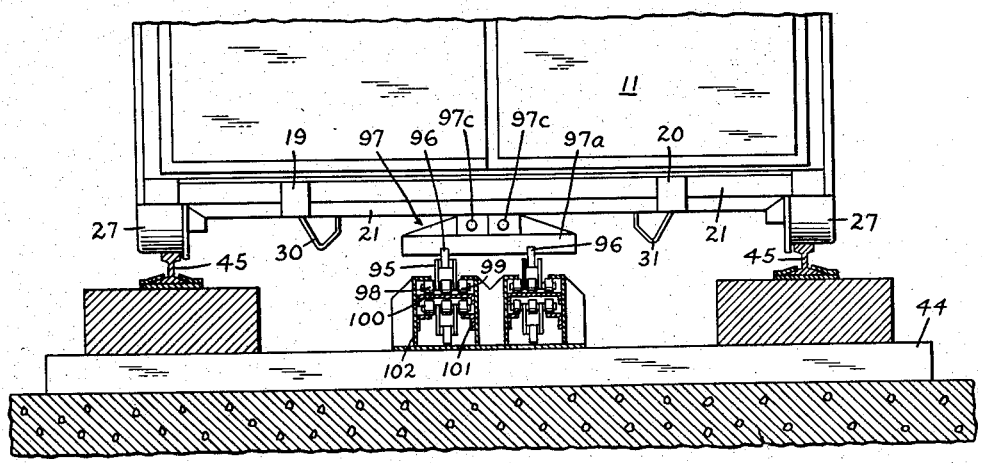
Figure 12 is a view in cross section taken through a railway track and chain conveyor mechanism in the terminal by means of which the trailer bodies are moved from one point to another.

As indicated above, the present invention makes use of motor vehicles of unique type for the handling and transportation of freight by land and on sea. As best shown in Figures 5 to 9, the basic unit of the present transportation system is a vehicle such as a truck or, as illustrated, a tractor-drawn trailer 10 having a trailer body 11 and a chassis 12 for carrying it. The chassis 12 of the trailer includes a frame 13 of suitable construction preferably formed of channel or box section members and of adequate strength to handle loads, for example, of ten to twenty tons or more. Suspended from the frame by appropriate springs 14 are the trailer wheels 15, 16 which may be on single or dual axles as may be required depending upon the loads to be carried. The wheels may be located with respect to the frame to comply with the requirements of the various states in which the trailers are to be operated. The front end of the trailer chassis is adapted to be supported by the usual fifth wheel 17 on a truck tractor 18 of any suitable type. It will be understood that the body may be formed of two or more smaller boxes or bodies and may be mounted on a truck or trailer chassis.

The present trailer differs from conventional trailers in that the trailer body or box 11 is a self-contained and self-supporting structure. It is suitably formed of a reinforced sheet metal, such as, aluminum, and is provided with stiffening girders 19, 20 and cross members 21 to render the body strong and rigid. As illustrated, the trailer body has rear doors 22, 23, but, if desired, it may be provided with side doors.

Mounted on brackets 24, 25 on opposite sides and adjacent to the ends of the trailer body, but underlying it are rotatably mounted small, flanged wheels 26, 27 of a type suitable for engaging railway rails or the like, so that the body can be moved along tracks in a fashion similar to a railway freight car. The body 11 is positioned on the chassis 12 and retained against endwise and lateral shifting by means of downwardly extending projections 30, 31 located and adjacent to fore-and-aft ends of the body 11 which engage the lateral sides of the frame 12, as shown more particularly in Figure 6. Movement of the body relative to the frame is prevented by means of suitable latching mechanism such as is illustrated in Figure 10. The latching mechanism shown therein includes a series of bolts 33, 34 mounted for a sliding movement in the side members of the frame 12. The inner ends of the bolts 33 and 34 are pivotally connected to the links 35, 36 which are pivotally connected to each other to form a collapsible toggle. The inner ends of the links 35, 36 are connected to a push rod 37 which is slidably supported on the frame 12 and has an enlarged head 38 extending outwardly beyond the rear end of the frame 12. A spring 39 is interposed between the head 38 and the end of the frame 12 and normally straightens the toggle to bias the bolts 33 and 34 outwardly. The ends of the bolts are adapted to be received in holes in the ends of the downwardly extending projections 30 and 31 thereby locking the body securely to the chassis. However, when the trailer is backed up against an abutment, as will be described hereinafter, the push rod 37 is moved to the left as viewed in Figure 10, thereby withdrawing the bolts and releasing the body 11 of the trailer from the chassis 12.

In order to unload the trailer body 11 from the chassis and to reload the body on the chassis, a transfer rack or unloading platform is provided as shown in Figures 5 to 9. As shown therein, the unloading platform includes a level surface 40 across which the tractor and trailer can be backed onto a platform 41 at the same level. The platform 41 is suspended above a well or depression 42 and is below the level or a ramp 43 or portion of a terminal yard to be described herein which is provided with railroad tracks including ties 44 supporting railroad rails 45.

Parallel side frame members 46 and 47 are disposed on opposite sides of the platform 41 and have beams forming upper surfaces or tracks 48, 49 substantially in the plane of the upper edges of the rails 45. Extending upwardly from the surfaces 48, 49 are guide rails 50, 51 by means of which the flanged wheels of the trailer body may be brought into alignment with the railroad rails 45 so that an easy and accurate transfer of the body 11 can be made from the surfaces 48, 49 to the railroad rails. The surfaces or tracks 48 and 49 may be inclined slightly downwardly toward the ramp 43 so that the trailer body will roll by gravity onto the rails 45 or, a power driven mechanism such as a rubber tired wheel 52 driven by means of a reversible electric motor 53 may be mounted on one or both of the frame members 46 and 47 for engaging the side or sides of the trailer body and moving it off or onto the platform. If desired a plurality of such wheels or their equivalent may be used to move the trailer body.

Inasmuch as the trailer body may contain as much as twenty tons of freight, it is impractical to provide an unloading platform in which this weight must be lifted through any substantial distance by operation of the tractor during unloading and replacement of the trailer body. To avoid such lifting, the platform 41 is suspended on hydraulic jacks or cylinders 54, 55 at its front and rear ends. The cylinders 54a, 55a of the jacks are suspended by means of pivots 56 having their axes extending lengthwise of the side frames 46 and 47. The lower ends of the piston rods 54b, 55b of the jacks or cylinders are connected to the platform 41 by means of pivots 57 also having their axes lengthwise of the side frames. Due to the arrangement of the cylinders and pivots, the platform can move laterally to enable proper alignment of the trailer with the unloading platform to bring the trailer body wheels 26, 27 against the supporting surfaces. Such alignment is further facilitated by providing guide flanges 60, 61 on the platform which engage inside the tires of the trailer and cause the platform to move laterally as the body wheels engage the aligning elements 50 and 51. Moreover, it may be desirable to provide guide flanges 62 and the loading surface 40 to assure substantially correct alignment of the trailer with the unloading platform.

A typical unloading operation is as follows: a tractor vehicle will back the trailer 10 onto the platform 41 with the latter at the same level as the loading surface 40 so that the wheels 26, 27 on the trailer body 11 are spaced a fraction of an inch or thereabouts above the surfaces or tracks 48, 49. During backing of the trailer, its wheels 15 and 16 are guided by the guide flanges 62 into engagement with the flanges 60 and 61 on the platform 41 and engagement of the wheels 26, 27 on the trailer body with the guiding rails 50, 51 will then cause a lateral movement of the entire trailer, if necessary, to dispose the body wheels 26, 27 between the guide rails 50, 51. When the trailer has been backed up against the abutment surface 63 at the rear of the unloading platform, the hydraulic cylinders 54, 55 may be actuated to lower the platform 41 to the position shown in Figures 7 and 8 so that the wheels 26, 27 on the body 11 of the trailer drop onto the supporting surfaces 48, 49. It will be understood as the trailer backs into the unloading platform, the bolt release mechanism shown in Figure 10 will be actuated by contact of the head 38 thereon with the abutment surface 63 at the end of the ramp 43 to release the body from the chassis. The motor 53 is started and the wheel 52 driven thereby will push the body 11 off the unloading platform onto the track 45. Hydraulic pressure may then be supplied to the jacks 54, 55 to raise the platform 41 to a level of the unloading surface 40 and the trailer chassis may then be taken away by the tractor.

A trailer body may be attached to a chassis 12 by reversing the operation, that is, by backing a trailer chassis onto the platform 41, lowering the platform 41, pushing a trailer body 11 into a position overlying the chassis and then raising the chassis to re-engage the body with the frame. When the tractor pulls the re-assembled chassis and body from the unloading platform or rack, the bolts 33, 34 will engage to lock the body to the chassis.

Figure 11:
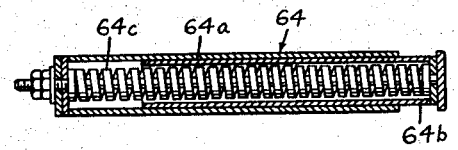
Figure 11 is a view in longitudinal section through a bumper for use in the trailer bodies to enable them to be moved by contact with each other.

The hydraulic cylinders 54, 55 may be operated manually under the control of a supervisor, or, if desired, an automatically-operating valve may be used to release hydraulic pressure from the cylinders when the trailer chassis is backed completely into the unloading platform or rack. Movement of the trailer body off the unloading rack or onto the unloading rack may be used to actuate the valve to supply pressure to the jacks to lift the chassis to the level of the loading area 40. With such automatic operation, the truck driver need not even leave the cab of the vehicle to unload or to load a trailer body. A preferred form of trailer body 11 is provided with bumpers 64, shown in Figure 11, which consist of telescopically-related sleeves 64a, 64b having an interposed spring 64c. The bumpers are mounted in pairs at one end of each body so that they can engage to enable one body to push another without damage to the bodies. The location of the bumpers can be varied so long as the bumpers on one trailer body will engage the end of another body.

Figures 1 and 2 show, schematically, a typical terminal or marshalling yard for loading and unloading trailer bodies of the type described on flat cars, ships, barges and the like. In Figure 1, each of the dotted lines 65, 66, 67, 68, 69 and 70, represents a railway track including two rails 45 supported on ties and provided with suitable ballast. Each track is long enough to receive a plurality of the detached trailer bodies. A plurality of groups A, B, C and D of such tracks can be provided in each terminal. At the left-hand end of group A of tracks 65 to 70, are a series of unloading platforms 71 like the unloading platforms or racks described above. Each track 65 to 70 has its own unloading platform 71. The groups of tracks A and B are used to receive trailer bodies and the groups C and D are used to load trailer bodies on the trailer chassis or other vehicle for over the road delivery. While a typical yard having four groups A to D of tracks 65 to 70 is disclosed, it will be understood that more or fewer groups of such tracks may be provided, depending upon the size of the port and the amount of cargo or freight to be handled.

The tracks 65 to 70 in group A and in the other groups B to D are located to conform to the shape of the terminal site, and as shown, extend lengthwise of the terminal illustrated. Each group is interrupted along its length by transfer device 72 of the kind shown in Figures 19 and 20 of the drawings. The transfer device consists of a carriage 73 having flanged wheels 73a, 73b, 73c and 73d which are mounted on a pair of tracks 74, 74a extending transversely of the tracks 65 to 70 and carries a pair of tracks 75, 75a on its top which can be aligned with any of the sets of tracks 65 to 70. The carriage can be moved back and forth across the tracks 65 to 70 by means of chains 76, 76a driven by means of a reversible electric motor 77 or in any other suitable way so that it can receive a car from any of the tracks 65 to 70 and transfer it to any of the other tracks of the group thereby to sort and assemble on one track all of the freight going to a single destination.

A similar transfer device will be provided for each of the other groups B to D of tracks shown in Figure 1. Also at the far ends of each group of tracks from the unloading platform 71 are other similar transfer devices 72' which may be used for all or only a part of the tracks of a group or for transferring bodies from one group to another group.

Another transfer device 78 is used for loading and unloading barges 79 which may be brought up to the unloading tracks 80 and 81 on the dock 82. The track 80 leads into the transfer device 72', and the track 81 extends to the transfer device 78 by means of which trailer bodies can be transferred to any of the groups of tracks A to D, and also to the railway siding 83. Flat cars for carrying the trailer bodies "piggy-back" can be loaded and unloaded on the siding 83.

It will be seen that one railway track of each group A to D, for example, the track 69, has an extension leading to a loading ramp 88 by means of which the cargo ship S can be loaded. As illustrated, there are four such lines 84, 85, 86 and 87 leading to an upper loading level 88' and a lower loading level 88'' of the ramp 88. Each level 88' and 88'', as illustrated, is capable of handling two bodies side by side so that four bodies simultaneously can be loaded into the ship S through the loading door 89 thereof onto the upper deck 90 and the second deck 91 of the ship.

Inasmuch as it is desirable to advance the bodies in endwise spaced relation to the transfer devices, the ship tracks elevators (to be described) in the ship in order to maintain a proper time interval for transfer of the bodies to different, appropriate mechanism for accomplishing such spacing and timing are provided. Mechanisms such as gears, friction wheels, conveyors and for advancing the bodies intermittently or at different rates of speed as described hereinafter can be provided for this purpose.

Movement of the detached trailer bodies on their wheels 26, 27 during loading, classifying and unloading operations is accomplished by means of motor-driven conveying chains 95 of the kind disclosed in Figures 12 to 17 which are provided with pivoted dogs or teeth 96 for engaging abutment members 97 carried by the trailer bodies. As shown in Figure 16, a chain which is to be used to move a body or series of bodies 11 in one direction has a series of dogs 96 mounted on extensions 95a of the links of the chain with their upper ends all facing in the same direction. Each dog is weighted so that end 96a thereof which engages the abutment 97 is always lifted upwardly. Rocking movement of the dogs 96 is limited by the stop lugs 96b and 96c thereon. Other types of chains 95' which are used to move bodies 11 in both directions have oppositely facing pivoted dogs 96' and 96'' mounted thereon for engaging a car body in either direction of movement of the chains.

The abutment members 97 with which the dogs engage include cross-bars 97a and 97b which are mounted at opposite ends of parallel rods 97c slidable in a bracket 97d fixed to the bottom of the trailer body 11 as shown in Figures 7, 12, 13 and 18. Compressible blocks 97e of rubber are mounted on the rods between the cross-bars 97a and 97b and abutment 97f to cushion the shock of engagement of a tooth or dog 96, 96' or 96'' on a chain with the cross-bar 97a or 97b.

As shown in Figures 12 and 15 to 17, the chains are provided with rollers 98, 99 which ride on upper and lower sets of tracks 100, 101 in channels 102 extending lengthwise of the tracks and supported by the ties 44.

Each of the tracks in the terminal is provided with a long conveyor 104 (Figure 14) which can be driven in either direction at a relatively low speed, for example, at about 18 feet per minute and has dogs 96' and 96'' thereon. Adjacent the transfer members 72, 72' and 78, additional shorter conveyors 105 are provided, these conveyors being similar and overlapping conveyors 104, extending along the tracks but moving at a higher rate of speed, for example, about 84 feet per minute in order to advance the trailer body onto the transfer device. In like fashion, as shown in Figure 19 the carriage 73 of each transfer device 72, 72' and 78 is provided with a chain transfer conveyor 106 of the high speed reversible type shown in Figure 17 so as to move the trailer bodies quickly off of the carriage onto a selected track. The conveyor 106 of the transfer device is driven by a reversible electric motor 107 which is supplied with electricity by means of the cables 107a, 107b which wind up or unwind from the spring or otherwise rotated drums 108, 108a on the carriage 73 as it moves on the tracks 74, 74a. The ramp 88 likewise is provided with reversible conveyors of the type shown in Figure 17 at its different levels which operate at a speed of about 84 feet per minute in either direction to load and unload the ship.

From the preceding description of a typical marshalling yard or terminal, it will be apparent that the trailer bodies 11 can be detached from the trailer chassis 12 at the unloading racks 71 and transferred and moved along any of the tracks in the groups A and B. Likewise, trailer chassis can be loaded with the trailer bodies from any of the tracks in groups C and D. If desired, however, alternate lanes in each group can be used for loading and unloading. Moreover, the transfer devices 72, 72' and 78 are operated to transfer trailer bodies from one section of the terminal to the other, that is, to any track thereon, to transfer bodies from the railroad siding 83 or the barge 79 onto either the incoming or outgoing groups of tracks A to D and any of the groups of tracks can be used to load or unload the ship S.

The ship S itself is of unique construction. It is provided with a plurality of decks, as illustrated, an upper deck 90, a second deck 91 and the third, fourth and fifth decks 110, 111, and 112. As shown in Figure 3, the rear portion of the ship has the usual engine room, crew and officers' quarters and other operating equipment for the ship. Only the upper deck 90 of the ship will be described inasmuch as the second, third, fourth and bottom decks are similar, differing only in their size, location and storage capacity. As shown in Figure 4 the upper deck 90 has two center tracks 113 and 114 which can receive trailer bodies simultaneously from the upper level 88' of the ramp 88. Each of the center tracks 113 and 114 is provided with chain conveyors 115 and 116 of the kind shown in Figure 17 which operate at relatively high speed, for example, 84 feet per minute in either direction and have pivoted dogs 96' and 96'' for pushing the trailer bodies in either direction along tracks 113 and 114. The tracks 113 and 114 are also equipped with chain conveyors 117 and 118 extending along the major portion of the length of the tracks. The conveyors 117, 118 are relatively long-chain conveyors of the kind shown in Figures 15 and 16 which are operated at a lower speed, for example, about 18 feet per minute in the unloading direction and 84 feet per minute in the loading direction. They are equipped with pivoted pusher dogs 96 or teeth for conveying in the unloading direction only. In addition to the above conveyors, are conveyors 119 and 120 which are short-chain conveyors operated at, for example, 18 feet per minute in a loading direction and 84 feet per minute in the unloading direction. These conveyors are equipped with pivoted pusher dogs as shown in Figures 16 and 17 for conveying in the loading direction only. During loading, they receive the trailer bodies from the conveyors 115 and 116 and push them down the lane end to end into their stowed positions.

Each of the center lanes 113 and 114 is also provided with reversible high-speed, short-chain conveyors 121 and 122 for moving the trailer bodies on and off the opposite ends of the transfer devices 123 and 124 adjacent the middle of the ship. The transfer devices 123, 124 are like the transfer devices 72 described above and they also are provided with reversible short-chain, high-speed conveyors 125 and 126 for transferring the trailer boxes from the center track 113 or 114 to the portions 113a and 114a of the tracks 113 or 114 aft of the transfer devices or from the track 113 to tracks 127, 128 and 129 or from the track 114 to the tracks 130, 131 and 132. The tracks 127 to 132 also are provided with loading and unloading conveyors corresponding to the conveyors 121, 117 and 119, respectively, for moving the trailer boxes end to end along the tracks.

At the aft ends of the tracks 113 and 114 are a pair of elevators 133 and 134 by means of which the trailer bodies can be transferred from the upper deck 90 to the second deck 91. The elevators 133 and 134 are also provided with the high-speed reversible conveyor chains 135 and 136 to enable the trailer bodies to be moved onto and off them as required.

Figure 3 shows that each of the decks 91, 110, 111 and 112 is also provided with lane transfer devices 137, 138, 139, similar to the lane transfer carriages 72 and 72'. Moreover, a pair of trailer body transfer elevators 140 operates between the decks 91 and 110 and another pair of deck transfer elevators 141 operate between the decks 110 and 111. Also, a pair of deck transfer elevators 142 is provided between the decks 111 and 112. The arrangement of the elevators and tracks, as well as the transfer devices on the decks is such as to enable any row of any deck to be filled quickly and expeditiously from the top deck 90 or the second deck 91. Likewise, any deck or any lane of any deck can be unloaded without disturbing the trailer bodies on other decks merely by unloading the two center lanes of the top or the middle deck. In this way, the transfer devices and elevators can be operated to move the trailer bodies even from the outermost rows inwardly to the center rows and then transfer them by means of the conveyor chains out of the open end of the ship. A particular advantage of the system of loading and unloading the ship is that operators are required only at each of the transfer devices after the loading operation has been started. Each operator controls one of the transfer devices 123, 124, etc. so that the incoming trailer bodies are transferred to the proper rows depending upon their destination. Similarly, the elevators receive the incoming cars and transport them to the corresponding decks depending upon the destination of the trailer bodies received at the elevators. By timing the conveyors in the manner indicated above and using rapid transfer conveyors for moving the trailer bodies onto and off the transfer devices and elevators, it is possible to load the trailer bodies at 100 second intervals on each track 113 or 114 and transfer the trailer bodies to other tracks on the same or other decks. A ship having a capacity of about 500 to 600 trailer bodies can be unloaded and reloaded in eight or nine hours without regard to weather conditions and without having trucks, tractors or operators thereof entering or leaving the ship.

Figure 13:
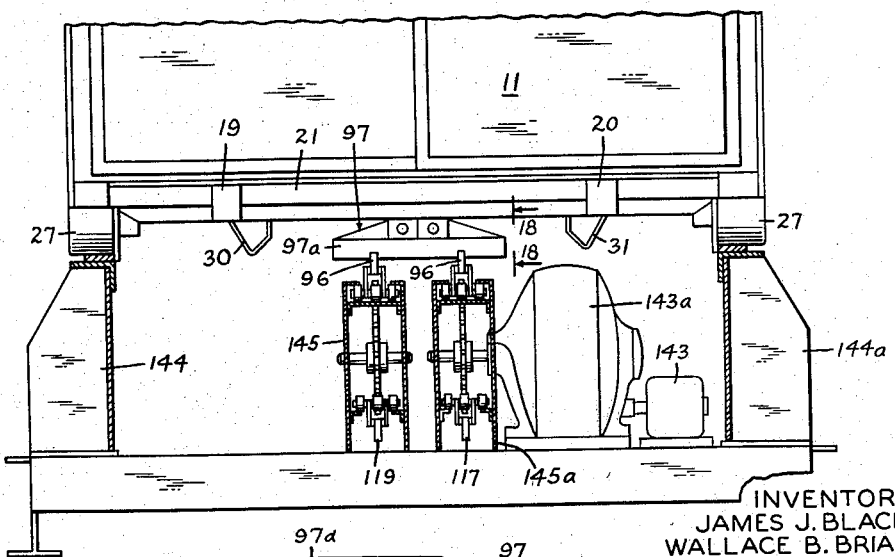
Figure 13 is a view in vertical section taken through the track on the deck of a ship and illustrating the chain conveyor system for moving trailer bodies therealong.
Figure 18:
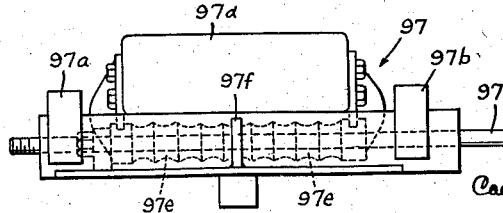
Figure 18 is a view in cross section taken on line 18—18 of Figure 13 illustrating a shock-absorbing abutment member.

It has been found most satisfactory to use hydraulic motors 143 of the reversible type with reduction gears 143a, as shown in Figs. 13 and 14, to drive the conveyor chains inasmuch as such hydraulic motors have low inertia and can be stalled continuously without damaging them. The motors 143 may be supplied with hydraulic fluid under pressure from a suitable central hydraulic system of conventional type. The motors may be installed between the elevated platforms 144 and 144a mounted on the ship deck that form the tracks etc. on which the wheels 25, 26 of the trailer bodies roll. It will also be seen that the conveyor chains, for example, chains 117 and 119 are guided in channels 145 and 145a or box elements extending lengthwise of the deck. Each of the chains 117 and 119 is driven in either direction by the different motors 143 at the speeds indicated above. Inasmuch as the motors can be stalled without damage, the motors driving the conveyors in a track space can be kept energized, when all the space in a row has been filled by trailer bodies, to urge the bodies tightly against one another to prevent them from shifting endwise during transportation. Similarly, the row of bodies can be kept from shifting by bringing them into end to end engagement and chocking the wheels of the end body or bodies.

Any suitable means may be provided for chaining or locking the trailer bodies to the rails and they can be locked in position by applying pressure against their tops or their sides by means of suitable clamping mechanisms of the type disclosed in Figures 21 to 23 of the drawings.

A suitable clamping mechanism for holding the bodies 11 may consist of two clamping members each of which includes an elongated angle iron 146 pivotally connected to parallel links 147, 148, having their outer ends pivotally connected to brackets 149 mounted on spaced apart columns 150 extending between the decks of the ship. The angle iron 146 is moved up and down by means of cranks 151 and 152 mounted on a shaft 153 extending lengthwise of the ship above the trailer body 11 and supported for rotation in bearings 154, 155 on the columns 150. Links 156 and 157 connect the cranks 151, 152 to the angle iron 146 so that upon rotation of the shaft 153 by means of the hydraulic jack 158, the angle iron can be brought into clamping engagement with a longitudinal corner of the body 11 to hold it firmly on the tracks. As shown in Figure 23, the hydraulic jack 158 may be supported pivotally at its lower end on a bracket 159 fixed to one of the columns 150 and its piston rod 160 is pivotally connected to a crank arm 161 on the end of the shaft 153. The angle iron is retained in either of its lifted or clamping positions by means of a spring toggle 162 interposed between the shaft 153 and a support (not shown) on one of the columns 150. The toggle 162 includes a lever 163 on the end of the shaft 153 and a compressed spring 164 pivotally connected at its upper end to the lever 163 and at its lower end to the support. It will be understood that the angle member 146 may be suitably padded to avoid damage to the cargo-carrying body 11 and that clamping members of the kind described are disposed on both sides of the track to engage the opposite upper longitudinal edges of the body or bodies 11.

A typical operation involving the transportation system may include the unloading of a cargo-carrying body 11 from a trailer, freight car on the rail siding 83 or from the barge 79 onto track 66, for example. Assuming that the cargo carrying body 11 is to be shipped to another port by means of the ship S and the body is only one of several to be transported to that port, it may be desirable to segregate all of the cargo-carrying bodies on track 69 before transferring them to the ship S. Accordingly, the cargo carrying body 11 is moved by the conveyors 104, 105 to the transfer device 72 which is operated to receive the body 11 and transfer it to the track 69 where it is fed onto the ramp track 84 and the upper ramp 88' onto the cargo track 113 on the upper deck of the ship. The body 11 is moved by means of the conveyor on the ramp onto the deck 90 of the ship where it is picked up by the fast conveyor 115 and pushed along track 113. Successive cargo-carrying bodies 11 will engage the preceding ones and will be pushed along at a lower speed after leaving the conveyor 115 by the slower moving conveyor 119 which operates at about 18 feet per minute in a loading direction. The cargo bodies are advanced slowly until the leading body is engaged by the high speed conveyor 121 moving at a spood of about 84 feet per minute and is transferred to the transfer device 123. If the trailer body is to be transferred, for example, to the outer track 129, the transfer device 123 is operated by the supervisor to move the trailer body laterally into alignment with the track 129 and then is discharged from the transfer device either fore or aft by the high speed conveyor 125 thereon, as may be required. The high-speed conveyor 121, which transfers the cargo body to the transfer device 123, enables the bodies to be spaced apart a sufficient distance so that the body 11 can be transferred from track 113 to another track and the transfer device 123 returned to alignment with the track 113 before another trailer body is advanced to the transfer device 123. As indicated above, the timing interval may be on the order of 100 seconds for each body.

When the cargo-carrying bodies are to be transferred to the elevators for movement to another deck, the transfer device 123 will stay in alignment with the track 113 and will merely act as a section of the conveying system thereof to move the trailer bodies back to the elevators or to the section of the track 113 aft of the transfer device.

Trailer bodies can be supplied until all of the spaces on all of the tracks on that deck are filled, at which time the rows of trailer bodies can be clamped in position by the hydraulic motors or by chocking them on the tracks and by means of the clamping devices shown in Figures 21 to 23.

When the ship arrives at another port, it may be desired to unload the cargo, for example, from track 132, without unloading either track 130 or 131. To unload the bodies on track 132, all of the trailer bodies on track 114 are unloaded by actuation of the conveyor 118 which, as indicated above, operates only in the unloading direction and carries the bodies forward to the high-speed conveyor 116 which discharges them over the loading ramps into the terminal., When the track forward of the transfer device 124 is cleared, the transfer device 124 is used to discharge and receive trailer bodies from the track 132 and transfer them to track 114 where they are discharged from the ship by means on conveyors 118 and 116. After the track 132 has been unloaded, other cargo-carrying bodies can be loaded on this track and the cargo-carrying bodies formerly on track 114 are returned to that track in the manner described above.

The bodies discharged from the ship at one of its ports into the terminal there can be transferred either to trailer chasses for over-the-road transportation, or can be transferred to barge or to rail freight cars for "piggyback" transportation.

From the foregoing, it will be apparent that the system has been provided by means of which trailers carrying loaded trailer bodies may be moved into the terminal and the body detached therefrom to be properly sorted and assembled with other trailer bodies having a similar destination. The sorted bodies are then transferred by the chain conveyors to barges, to railway flat cars for "piggy-back" travel, or to ships for lake or ocean transport. Similarly, trailer bodies discharged from other ships, barges or "piggy-back" railway cars, are sorted as to destination, and transferred to trailer chassis for transportation over the road or to other barges, ships or cars for transportation to their destinations. The use of separate bodies enables a relatively small number of trailer chassis in a given area to handle a much larger number of trailer bodies thereby greatly reducing the investment in equipment and rendering the transportation of freight or cargo much more economical. Moreover, the use of closed trailer bodies reduces damage to and pilferage of their contents.

It will be understood that the terminal or marshalling yard can be located in any suitable port area and that its size and arrangement depends upon the amount of cargo or freight to be handled therein and the space available for the terminal. Also, the size of the ships and their design and the arrangement of the tracks therein may be modified depending upon requirements. For example, some decks of the ships or other water craft may be adapted to handle railway freight cars, trucks, complete trailers or bulk cargo, depending upon the requirements. Likewise, the chassis used and the size of the demountable body therefor is susceptible to modification depending upon the type of freight to be transported and the laws of the areas in which the vehicles are to be operated. Accordingly, it will be understood that the invention is susceptible to considerable modification and that the system and its components described herein should be considered as illustrative.

We claim:

1. A loading and unloading device for a vehicle having a wheel-supported chassis and a detachable cargo-carrying body having wheels thereon, comprising an elevated platform having means thereon to support said body for rolling on its wheels, a lower platform for supporting said vehicle, lifting means connecting said upper and lower platforms and supporting said lower platform for lateral and up and down movement, and power means for actuating said lifting means to move said lower platform up and down.

2. A loading and unloading device for a vehicle having a wheel-supported chassis and a detachable cargo-carrying body having wheels thereon, comprising a platform onto which said vehicle can be moved, wheel-engaging members in spaced substantially parallel relation mounted above said platform to receive the wheels on said body for rolling movement and for supporting said body when said platform is in said lower position, power actuated jacks pivotally connected to said platform and to said wheel engaging members for supporting said platform below said wheel-engaging members and for lateral movement relative to said wheel engaging members, and guide means on said wheel engaging members for engaging said vehicle to guide it and bring the body wheels into alignment with said wheel-engaging members.

3. The loading and unloading device set forth in claim 2 in which the jacks for moving the platform up and down are hydraulic jacks.

4. A loading and unloading device for a vehicle having a wheel-supported chassis and a detachable body having wheels thereon, comprising an upper platform having spaced apart substantially parallel side frame members, track means on said side frame members to engage and support said body wheels for rolling thereon, a lower platform, hydraulic cylinders connecting said lower platform to and suspending it from said upper platform for raising the lower platform to a first position in which a vehicle can be moved onto and off of the lower platform with the body wheels out of engagement with said track means, and lowering the lower platform to engage the body wheels with said track means and detach the body from the chassis, means pivotally connecting said hydraulic cylinders to said upper and lower platforms to enable the lower platform to move laterally to align the trailer body wheels with said track means, and means for moving the body along said upper platform.

5. A loading and unloading device for a vehicle having a wheel supported chassis and a detachable body having wheels thereon, comprising an upper platform, track means on said upper platform to engage and support said body wheels for rolling thereon, a lower platform, lifting means connecting said lower platform to and suspending it from said upper platform for raising the lower platform to a first position in which a vehicle can be moved onto and off of the lower platform with the body wheels out of engagement with said track means and lowering the lower platform to a second position to engage the body wheels with said track means and detach the body from the chassis, and means pivotally connecting said lifting means to said upper and lower platforms to enable the lower platform to move laterally to align the trailer body wheels with said track means.

References Cited in the file of this patent

UNITED STATES PATENTS

| Number | Name | Date |
| --- | --- | --- |
| 444,227 | Tiffany | Jan. 6, 1891 |
| 755,087 | Ward | Mar. 22, 1904 |
| 800,165 | Morgan | Sept. 26, 1905 |
| 982,977 | Morgan | Jan. 31, 1911 |
| 1,132,960 | Moreland | Mar. 23, 1915 |
| 1,337,945 | Nolan | Apr. 20, 1920 |
| 1,796,557 | Bristol | Mar. 17, 1931 |
| 2,247,144 | Baldwin | June 24, 1941 |
| 2,451,198 | Burke | Oct. 12, 1948 |
| 2,478,578 | Gottshall | Aug. 9, 1949 |
| 2,631,885 | Ault | Mar. 17, 1953 |
| 2,675,134 | Becker | Apr. 13, 1954 |
| 2,691,450 | Rosenbaum | Oct. 12, 1954 |